United States Patent [19]

Blaser

[11] 4,123,931
[45] Nov. 7, 1978

[54] METHOD FOR UNIFORMLY COATING LIQUID PHASES ON GLASS BEADS AND APPLICATIONS THEREOF

[75] Inventor: Wayne W. Blaser, Midland, Mich.

[73] Assignee: The Dow Chemical Company, Midland, Mich.

[21] Appl. No.: 834,627

[22] Filed: Sep. 19, 1977

Related U.S. Application Data

[63] Continuation of Ser. No. 711,196, Aug. 3, 1976, abandoned.

[51] Int. Cl.$^2$ .................. B01D 15/08; G01N 31/08
[52] U.S. Cl. ............................ 73/23.1; 23/232 C; 55/67; 210/31 C; 427/214; 428/406
[58] Field of Search ............ 23/232 C; 55/67, 197, 55/386; 427/214; 428/406; 73/23.1; 210/31 C

[56] References Cited

U.S. PATENT DOCUMENTS

| | | | |
|---|---|---|---|
| 3,944,389 | 3/1976 | Solomon | 23/232 C X |
| 4,042,326 | 8/1977 | Kallos | 23/232 C X |

OTHER PUBLICATIONS

H. L. MacDonell, Anal. Chem., vol. 40, No. 1, pp. 221–224 (Jan., 1968).
E. J. Malec, J. Chromatographic Science, vol. 9, pp. 318–320 (May, 1971).
A. L. German et al., J. Chromatographic Science, vol. 11, pp. 76–82 (Feb., 1973).

*Primary Examiner*—Joseph Scovronek
*Attorney, Agent, or Firm*—Burke M. Halldorson

[57] ABSTRACT

A method is provided for uniformly coating a stationary liquid phase on glass beads, which are then suitable for use as chromatographic column packing, which comprises first contacting the beads with a first solution containing a suitable surfactant in an amount effective to promote the uniform deposition on the beads of the desired liquid phase, said surfactant being selected from the group consisting of (a) a nonionic surfactant, (b) an alkylaryl polyethylene ether phosphate, of the formula

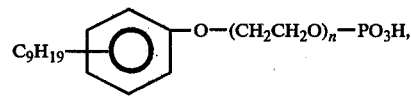

and (c) a mixture of nonionic surfactants, and then contacting the beads with a second solution containing a stationary liquid phase, the concentration of said stationary liquid phase in said second solution, the nature of the solvent in said second solution, and the conditions of said second contacting step being selected so that a coating of said stationary liquid phase of from about 0.05 to about 0.5 percent is imparted to said beads. Glass beads coated according to the above procedure represent an advance in the art of chromatography in that columns packed with these beads exhibit improved resolution and component adsorption characteristics.

13 Claims, No Drawings

METHOD FOR UNIFORMLY COATING LIQUID PHASES ON GLASS BEADS AND APPLICATIONS THEREOF

This application is a continuation of prior copending application, Ser. No. 711,196, filed Aug. 3, 1976, now abandoned.

BACKGROUND OF THE INVENTION

1. Field of the Invention

The invention relates to a new method of preparing uniformly coated etched glass beads suitable for use as a gas chromatographic column packing. It encompasses the use of a suitable surfactant to promote uniform coating of the liquid phase and minimize thereby tailing of peaks. Within the scope of the invention are included the method of uniformly coating the beads, beads so coated, and the use of the beads in a separation of chromatographically reactive species.

2. Description of the Prior Art

In gas chromatography, separation of gaseous components is accomplished by the presence of a stationary liquid phase coated on a solid support. This solid support may be diatomaceous earth or glass beads, and in the case of open tube capillary columns, may also be the wall of the tube itself. If the solid support is not completely coated and deactivated, potential Lewis acid sites on the support, such as $Ca^{++}$ ions, may cause adsorption of lon pair donor molecules such as ketones and amines. When the components are polar, adsorption on an exposed surface occurs readily even in the absence of Lewis acid sites. Adsorption reduces the resolution of the chromatographic separation by causing "tailing" of the peaks. In addition, the literature, e.g., MacDonell, H. L. and Eaton, D. L., *Anal. Chem.*, Vol. 40, p. 1453, (1968), suggests that exposed potential Lewis acid sites on the support may catalyze the decomposition of the gaseous components, particularly at the higher temperatures necessary for the elution of many organic molecules. This also decreases the accuracy of the chromatographic separation.

Thus, it is necessary to achieve a uniform coating on the solid support. Various methods have been employed in attempts to produce such a uniform coating on glass beads, including the filtration method described in Corning Glass Works Product Bulletin, "Data Sheet 102 — Corning GLC-100 Series Support"; the evaporation of solvent from a slurry of the materials in an open vessel used by commercial chromatographic suppliers; and the removal of solvent using a vacuum rotary evaporator, Filbert, A. M. and Hare, M. L., *J. Gas Chromatography*, Vol. 6, p. 150 (1968). None of these methods produces uniformly coated beads. As a result, beads coated according to these methods cause poor resolution and selectivity when used as packing in a gas chromatographic column, since adsorption takes place on the uncoated sites. Additionally, the product is not consistent from one lot to the next, so reproducibility of chromatographic results is difficult to obtain.

Under certain conditions (often normal operating conditions), the liquid phase migrates from the solid support, and then interferes with the detection of the gaseous components. This migration is variously referred to as "liquid phase bleeding" or "column bleed". It becomes more pronounced as the temperature is increased, presumably due to thermal degradation of the liquid phase.

The use of sodium silicate beads alleviates to an extent the above problems, since the number of potential Lewis acid sites, e.g., $Ca^{++}$ ions, is greatly reduced. However, polar components are adsorbed even where no potential Lewis acid sites are exposed, so tailing still occurs when polar components are separated using a liquid phase coated by conventional means on sodium silicate beads.

It has also been reported (see MacDonell, H. L. *Anal. Chem.*, Vol. 40, No. 1, p. 221, (1968)) that etching the surface of the beads improves their performance as a gas chromatographic column packing. With smooth glass beads the liquid phase is drawn by capillary action to "puddles" at the points of bead contact, leaving only a very thin film of liquid phase on the rest of the bead. This unevenness in the depth of the liquid phase causes the column to have poor separating efficiency. Etching allows a more even distribution of the liquid phase, with a consequent increase in the column's separating efficiency. Etching also allows an increased amount of liquid phase to be coated on the beads, leading to increased column capacity. However, the coating on etched glass beads is not completely uniform, so adsorption occurs, especially with polar compounds, causing tailing of the peaks.

The use of a surfactant in a method of coating a liquid phase on the wall of an open tubular gas chromatographic column has been reported. See Malec, E. J. *J. Chromatographic Science*, Vol. 9, p. 318 (1971). Significantly, however, Malec teaches only cationic surfactants (quarternary phosphonium halides), whereas cationic surfactants, such as di-isobutyl phenoxy ethoxy ethyl dimethylbenzyl ammonium chloride, were found not to be effective in the present invention. Malec also adds the surfactant, benzyl triphenylphosphonium chloride, to the solution containing the liquid phase, and then applies both the liquid phase and the surfactant at one time. Additionally, the method taught is applicable only to smooth open tubular gas chromatographic columns. There is no suggestion to use the method to produce capillary column packings from etched beads.

Another use of benzyl triphenylphosphonium chloride in a procedure for preparing open tube capillary columns has been described by German, A. L. and Horning, E. C., *J. Chromatographic Science*, Vol. 11, p. 76 (1973). However, the purpose of the surfactant was chiefly to stabilize the dispersion containing the liquid phase, not to permit uniform coating nor to deactivate active sites on the column wall. Silanization of the glass surface prior to coating with the liquid phase was emphasized as necessary to deactivate the active sites. Both prewetting with solvent (chloroform) and suspension of 6–10 micron particles of silanized silicic aicd in the liquid phase solution were used to effect the desired spreading characteristics and produce thereby a uniform coating. Further, the column treated as described by German and Horning is taught to be sensitive to injections of solvent. As with Malec, the only surfactant taught is cationic, whereas the present invention employs only nonionic or anionic surfactants.

SUMMARY OF THE INVENTION

It has now been discovered that glass beads which have a uniform coating of a conventional liquid phase thereon can be consistently produced. Accordingly, one aspect of the invention is a method for uniformly coating liquid phases on glass beads, which are then suitable for use as gas chromatographic column packing, which comprises first contacting the beads with a first solution containing a suitable surfactant in an amount effective to promote the uniform deposition on the beads of the desired liquid phase, said surfactant being selected from the group consisting of (a) a nonionic surfactant, (b) an alkylaryl polyethylene ether phosphate of the formula

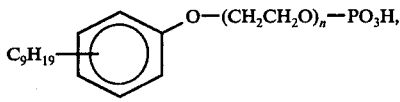

and (c) a mixture of nonionic surfactants, and then contacting the beads with a second solution containing a stationary liquid phase, the concentration of said stationary liquid phase in said second solution, the nature of the solvent in said second solution, and the conditions of said second contacting step being selected so that a coating of said stationary liquid phase of from about 0.05 to about 0.5 percent is imparted to said beads. Since this method produces a uniquely uniform coating on the beads, another aspect of the invention is an article of manufacture which comprises beads so treated. The use of these beads in methods of separating chromatographically reactive species is yet another aspect of the invention.

FURTHER DESCRIPTION OF THE INVENTION

At the heart of all aspects of this invention is the use of a surfactant to provide uniformity of the coating of the liquid phase of said beads. No liquid phase currently in use has been found for which the present invention fails to produce improved results.

In general, the surfactant itself does not appear to have any effect on the process of separating chromatographically reactive species. Rather, it is the uniformity of the liquid phase coating that results from the use of the surfactant, which is believed responsible for the improved performance. The surfactant apparently reduces the surface tension of the liquid phase and permits the liquid phase to flow evenly around each bead. When the bead is thus evenly coated, at least two conditions desired for good column performance are found: first, sufficient liquid phase is present to achieve fast mass transport between the stationary liquid phase and the mobile fluid (gas) phase, yet the depth of the stationary phase is uniform so that separating efficiency is good. Second, substantially no sites are exposed where the mobile phase may be adsorbed or decomposition thereof catalyzed.

While etching the glass beads does lead to a more uniform coating than with smooth beads, when using conventional coating procedures, even etched beads are not completely uniformly coated, and the degree of uniformity in coating is not reproducible. In contrast, all aspects of the present invention involve beads reproducibly coated with a highly uniform layer of stationary phase. The present invention leads to improved results with either smooth or etched beads, but it is greatly preferred that etched beads be used.

The solution concentration or surfactant which is effective to promote uniform deposition of the liquid phase on the beads is at least about 0.05 weight percent. The maximum concentration is not critical, except that when the concentration of surfactant is above about 1 percent, the amount of surfactant deposited on the beads is such that the surfactant begins to participate noticeably in partitioning process. This does not negative the utility of the invention, but since it is not necessary to use a concentration any greater than about 1 weight percent, the partitioning effect is generally avoided. Cost of the surfactant is also a consideration. The optimum surfactant concentration appears to be from about 0.25 to about 0.3 weight percent.

The amount of liquid phase deposited on the beads is directly related to the volatility of the solvent used. Ethyl acetate or acetonitrile will dissolve most of the commonly used liquid phases, and each is highly suited for use in solutions for coating glass beads. Using these solvents, or other suitable solvents with boiling points in the range of 75° C. to 85° C., a 2 percent solution of liquid phase will yield a coating of the substrate on the beads of about 0.1 percent. Those skilled in the art interpret "0.1 percent coating" to mean that the weight of the stationary phase coated on the solid support is 0.1 percent of the weight of the support. Chloroform may also be used for some liquid phases, but the solution concentration of the liquid phase should be reduced by about 25 percent to compensate for the increased volatility of the chloroform. A useable liquid phase coating can be as little as about 0.05 percent, achievable by using about a 1 percent solution of the liquid phase in ethyl acetate. It is preferred to use about a 0.1 percent coating. Increased coatings of liquid phase increase the column capacity, but some loss of resolution occurs, and the retention time of the components is increased. Additionally, as the liquid phase loading is increased, the beads increase in tackiness, thus increasing the difficulty of packing the column. Liquid phase coatings of about 0.5 percent, produced according to this invention with about a 10 percent solution of the liquid phase in ethyl acetate, have been successfully used on column packings in chromatographic separation.

The following procedure may be followed for coating the liquid phase on the beads. Of course, it is well within the ability of those skilled in the art to vary the scale of the operation and other non-essential details without deviating from the essence of the invention. First, as an optional step to ensure that the surfaces of the beads are free from foreign substances, 50 grams of the beads are rinsed with three 50-milliliter portions of each of acetone, then methanol, and then the solvent to be used for dissolving the liquid phase. The beads are then removed to a filter funnel and the solvent removed with vacuum. Next, sufficient surfactant to achieve a concentration of from about 0.05 to about 1 weight percent is dissolved in 40 milliliters of a solvent compatible with that employed with the liquid phase, preferably the same solvent as that employed with the liquid phase. Some surfactants are supplied already in solution. In such a case, the amount of surfactant solution to contain the desired amount of "active" surfactant should be used. Sufficient liquid phase solute to reach the desired solution concentration is then dissolved in 70 milliliters of the solvent selected, e.g., 1.4 gram to achieve a 2.25 percent solution in 70 milliliters of acetonitrile.

The next step in the procedure is to contact intimately the glass beads with the surfactant solution, such as by forming a slurry. This mixture is agitated and allowed to equilibrate for a short period, e.g., several minutes. Excess solution is removed with vacuum, but the beads are not dried. The liquid phase solution is then contacted intimately with the beads and the mixture agitated. After allowing a suitable time, e.g. 5 minutes, for the system to equilibrate, the solvent is removed, such as by suction. Final drying is accomplished without vacuum, allowing the beads to air dry with frequent stirring. The beads are free flowing when dry.

Alternatively, as where the surfactant is not readily soluble in the solvent desired for the liquid phase, the third solvent used to rinse the beads (in the first step of the procedure) may be one suitable for dissolving the surfactant, rather than the liquid phase. This solvent is then used in the application of the surfactant as above, using the same concentration of surfactant. A somewhat longer period of equilibration should be allowed before suctioning off the solvent, to ensure the sufficient coating of surfactant has been obtained. At this point the beads are dried (elevated temperature may be used but the beads should be cooled to ambient temperature before continuing). After the beads are dry, the solution containing the liquid phase is intimately contacted with the beads as above with agitation, and allowed to equilibrate. Solvent is removed, e.g. by suction, and the beads are allowed to air dry, as above.

Beads coated according to the above method may be packed into an ordinary chromatographic column, using techniques known to those skilled in the art. Beads so coated are considerably easier to pack into a column than those coated according to other methods because the beads of the present invention are free flowing and not tacky.

It is well-known to those skilled in the art to separate chromatographically reactive species by passing a fluid (either gas or liquid) containing such species over a bed consisting of a solid support which has thereon a stationary phase (usually liquid). When glass beads coated according to the above method are used as the bed in this process, separation is dramatically improved, compared to the known methods where no surfactant is used in the coating procedure. This improvement is reflected in increased resolution of components, decreased adsorption of polar components, decreased column bleed and increased temperatures at which the column may be successfully operated.

Before being used, packed gas chromatographic columns are "conditioned" by passing an inert carrier gas through the column for a suitable period of time at a certain temperature. When the sample to be analyzed is injected, the temperature usually is reduced to a certain level and then increased at a preset rate during the separation process. The conditioning temperature is frequently higher than the temperature range encountered in actual use of the column, and is maintained for a much longer period of time. Thus, it has a much greater effect on the packing than the actual operating temperature.

It is found that, in general, neither cationic nor anionic surfactants are effective in the present invention while nonionic surfactants are. Good results may also be obtained by using a mixture of two or more suitable surfactants, particularly when all components of the mixture are nonionic. In such a case, the solution concentration of the mixture should be from about 0.05 to about 1 weight percent. Fluorinated surfactants, whether anionic or nonionic, reduce column bleed, presumably because of their increased thermal stability.

The use of cationic surfactants, such as di-butyl phenoxy ethoxy ethyl dimethylbenzyl ammonium chloride, in coating the beads leads to poor resolution, excessive adsorption of polar compounds, and a high rate of column bleed. See Comparison Run 3. These deficiencies are particularly apparent at conditioning temperatures of 200° C. or higher.

Anionic surfactants usually lead to similarly poor results. Surfactant degradation, when either sodium lauryl sulfate or sodium alkylaryl sulfonate is used, for example, causes extremely high column bleed. See Comparison Run 2. An anionic fluorocarbon surfactant greatly reduces column bleed, presumably because of its greater thermal stability, but nonetheless exhibits poor resolution and excessive adsorption of polar compounds, evidenced by tailing of the peaks.

One anionic surfactant, however, does have a positive effect on coating efficiency, namely, a phosphate ester of (alkylbenzo)polyoxyethylene ether, of the formula

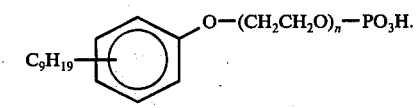

Resolution, adsorption, and column bleed characteristics are significantly improved, as compared to other anionic surfactants. However, the improvement is not as great as where a nonionic surfactant is used. See Example 2. This particular surfactant appears to affect the partitioning process, as it causes the relative retention times of some components to shift.

As a group, the nonionic surfactants are much more effective in producing the desired coating. At conditioning temperatures of 200° to 230° C., column packings made using nonionic surfactants all show great improvement over packings produced either with no surfactant, or with an anionic or cationic surfactant. Resolution is significantly improved, and adsorption of polar components is minimized. The nonionic surfactants generally exhibit greater thermal stability than the anionic ones, resulting in less surfactant degradation, and consequently minimal column bleed. Nonionic fluorocarbon surfactants exhibit thermal stability at higher temperatures than other surfactants, and therefore produce column packings with, in general, the least column bleed of any packing used at elevated temperatures.

Packings produced using nonionic polyoxypropylene, 40 percent ethoxylated, with an average molecular weight of about 1200, as the surfactant give excellent results with conditioning temperatures of up to about 230° C. One column with this packing was operated with conditioning at 230° C. for over 6 months with minimal column bleed and minimal adsorption of polar compounds. Above this temperature, however, the surfactant and the liquid phase migrate from the solid support with subsequent loss of resolution and column inertness.

A polyethylene glycol ether of a linear alcohol (a nonionic surfactant), when used in the present invention, produces a packing which gives results essentially the same as polyoxypropylene, and is thermally stable to at least 230° C.

Packings produced with the nonionic surfactants containing a plurality of fluorine atoms also have resolution and adsorption characteristics similar to the polyoxypropylene packings, but have dramatically increased thermal stability. One of these is Monflor 53 brand branched-chain fluorocarbon, available from Imperial Chemical Industries, Ltd. The Monflor brand fluorinated surfactants are produced by the reaction at the reactive olefinic fluorine of tetrafluorethylene pentamers, i.e.,

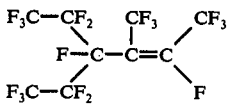

with various components having ionic or nonionic groups. Monflor 53 has polyoxyethylene capped with —OH as said nonionic group, and is thermally stable at temperatures approaching 270° C. A column packing made with it shows good resolution and little column bleed and adsorption up to 250° C. When the conditioning temperature is increased to about 270° C., some tailing of polar compounds appears.

Fluorad FC-430 brand fluorocarbon ester (nonionic), available from Minnesota Mining and Manufacturing Co., St. Paul, Minn., is somewhat less effective than polyoxypropylene in producing a column packing with good resolution and adsorption characteristics, but it has increased thermal stability. Based on data from infrared and NMR analyses, it is believed that Fluorad FC-430 is a mixed propylene oxide-ethylene oxide, copolymer substantially corresponding to the formula

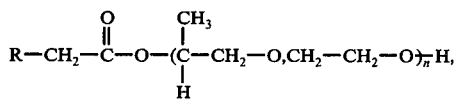

where R contains $CF_2$ groups, and $n$ is an integer of at least 2.

Fluorad FC-431 brand fluorinated alkyl ester (nonionic), also available from Minnesota Mining and Manufacturing Co., St. Paul, Minnesota, is presently considered the best surfactant for use in practicing this invention. Based on data from infrared and NMR analyses, it is believed that Fluorad FC-431 similar to FC-430, except that FC-431 is supplied in a concentrated ethyl acetate solution and apparently contains no propylene oxide linkages. It is believed the polymer contains at least about five ethylene oxide units, and has as terminal groups

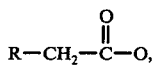

where R is a fluorinated alkyl group, —$OCH_3$, and —OH, corresponding substantially to the formula

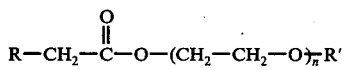

where R' is ether H or $CH_3$, (or the composition may contain a mixture of compounds, some of which have R as H and the rest of which have R as $CH_3$), and $n$ is an integer of at least about 5. It has resolution and adsorption characteristics similar to polyoxypropylene (see Example 3) but dramatically increased thermal stability. Packings prepared with Fluorad FC-431 as the surfactant have a maximum conditioning temperature approaching 300° C. The ability of this material to reduce surface tension and increase wettability of bead surfaces is such that, using the normal 2 percent solution of liquid phase, a slightly heavier liquid phase coating is obtained than with the other surfactants. This is indicated by the longer retention times of components with respect to other packings. The Fluorad FC-431 also causes inversion in the elution order of some components, but this is not considered to be a significant undesirable effect.

EXAMPLES

The following nonrestrictive examples and comparison runs further illustrate the practice of the present invention and its advantages over the prior art. The solid support was in each case 120/140 mesh etched sodium silicate beads.

Where used, surfactant solutions were prepared by dissolving 0.1 gram surfactant (based on the amount of active surfactant) in 40 ml of solvent. The stationary phase was applied to the beads from a solution prepared by dissolving 1.4 gram of liquid phase in 70 ml of solvent. This resulted in a nominal 0.1 percent coating of liquid phase, although the fluorinated alkyl ester produced a somewhat heavier coating. In Examples 1–3, and Comparison Runs 1–3, the liquid phase was OV-17 brand stationary phase, of the structure

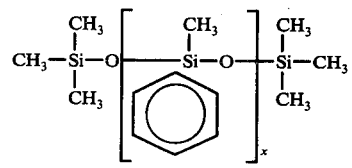

where $x$ is about 30. A borosilicate glass column about six feet long by two millimeters (inside diameter), was rinsed with acetone and methylene chloride and deactivated with dimethyldichlorosilane. The treated beads were then packed in said column, which was then installed in a Hewlett-Packard 5710A gas chromatograph equipped with a flame ionization detector. The same column was used for all runs. Using helium as the carrier gas, the packed column was conditioned at the indicated temperature for 16 hours. The column was then used to separate the components of each of two solutions. The first solution contained 50 micrograms per milliliter of a mixture of polychlorinated biphenyls (PCB's) in ortho-xylene, to test the resolution of the column. The second solution was a mixture of alcohols in methanol, and was used to observe adsorption of polar compounds. A flame ionization detector was used at a detector temperature of 300° C., and the sample size was 1 microliter. The temperature program for the elution of the polychlorinated biphenyl mixture was from 130° C. to 200° C. at 8° C. per minute, and for the alcohol mix from 40° C. to 200° C. at 8° C. per minute. The injection port was maintained at a temperature equal to or slightly greater than the conditioning temperature.

The chief exception to the above procedure is in Example 4 and Comparison Run 4. Example 4 describes an application of the beads of the invention in a method of analyzing air-borne concentrations of chloromethyl methyl ether and bis-chloromethyl ether. Comparison Run 4 is the same analysis using ordinary coated beads. The method of analysis, which utilizes 2,4,6-trichlorophenate derivatives of the two ethers, is described by R. Solomon and G. Kallos, *Anal. Chem.*, Vol. 47, p. 955 (1975).

EXAMPLE 1

Using polyoxypropylene as the surfactant, and ethyl acetate as the solvent for both the surfactant and the liquid phase, and conditioning the column at 230° C. superior resolution of the mixture of PCB's is obtained and minimal adsorption of the polar compounds occurs, resulting in minimal tailing.

COMPARISON RUN 1

A commercial packing, composed of a 0.1 percent coating of OV-17 brand stationary phase on etched sodium silicate beads, was obtained from Applied Science Laboratories, Inc., State College, Pa. The actual coating procedure followed by the manufacturer is unknown, but it is not believed a surfactant pretreatment was used. The packing as received was extremely sticky, causing difficulty in packing the column. With conditioning at 200° C., the resolution of the column was comparable to the case where polyoxypropylene was used, but the column bleed was extremely high and the lower molecular weight alcohols were strongly adsorbed.

COMPARISON RUN 2

Employing de-ionized water as the solvent for the surfactant, the alternate procedure as hereinabove described was used to apply sodium alkylaryl sulfonate (an anionic surfactant) to the beads prior to coating with the liquid phase, OV-17, which was dissolved in ethyl acetate. The column was conditioned at 200° C. Resolution was poor, and column bleed was high. Excessive tailing of polar components was also observed.

EXAMPLE 2

After conditioning at 200° C., when the column was packed using the anionic compound GAFAC RE-610, of the formula

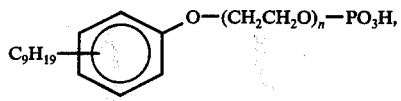

as the surfactant, and ethyl acetate as the solvent for both the surfactant and the liquid phase, improved resolution, column bleed, and adsorption characteristics were observed compared to the comparison runs. However, the results were not as good as in Example 1.

EXAMPLE 3

Using Fluorad FC-431 as the surfactant, ethyl acetate as the solvent for both the surfactant and the liquid phase, and 270° C. as the conditioning temperature, resolution and tailing were similar to the results in Example 1. Minimal column bleed was observed. When the column was conditioned at 300° C., a slight increase in tailing occurred.

COMPARISON RUN 3

A cationic surfactant, di-isobutyl phenoxy ethoxy ethyl dimethylbenzyl ammonium chloride, was applied from a de-ionized water solution, using the alternative procedure (0.1 gram surfactant was dissolved in 40 ml de-ionized water). OV-17 was applied employing a 2.2 percent solution of it in ethyl acetate. The column was conditioned at 200° C. Resolution was almost acceptable, but considerable column bleed was observed and adsorption of polar compounds was almost complete.

EXAMPLE 4

Polyoxypropylene was used as the surfactant to coat OV-275 brand stationary phase on 120/140 mesh etched sodium silicate glass beads. OV-275 is a polar cyano containing silicone polymer, available from Ohio Valley Specialty Chemical Company, Marietta, Ohio. Acetonitrile was the solvent for both the surfactant and the liquid phase. A column was prepared with the packing so produced, and used in the analysis of 2,4,6-trichlorophenate derivatives of chloromethyl methyl ether and bis-chloromethyl ether. The column has superior resolution characteristics, was virtually unaffected by injections of water and methanol and could be operated at 190° C., which allowed elution of even the heavier bi-phenate derivative without substantial decomposition. After several months of use, the column showed no degradation in performance.

COMPARISON RUN 4

A column packing was prepared by conventional means (using no surfactant) with a nominal 0.1 percent coating of

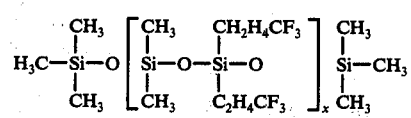

and a nominal 0.1 percent coating of

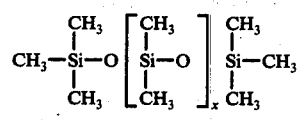

on etched sodium silicate beads, for a total liquid phase coating of 0.2 percent. A column prepared with this packing was used in the gas chromatographic analysis of 2,4,6-trichlorophenate derivatives of chloromethyl methyl ether and bis-chloromethyl ether. Resolution was inferior to that of the column in Example 4. The column was readily destroyed in injections of water. Additionally, the column could not be operated at temperatures exceeding about 140° C., due to column bleed. This prevented detection of the heavier bi-phenate derivative, which is more specific in the analysis.

What is claimed is:

1. In the method of separating a plurality of chromatographically reactive species wherein a gas containing a plurality of said species is passed through a bed comprising a solid support, said support having a liquid phase thereon, the improvement which comprises: employing as said bed, glass beads which have been treated by the method comprising the steps of contacting the beads with a first solution containing a nonionic, polymeric surfactant, or a mixture of nonionic, polymeric surfactants of alkylene oxide repeating units of 2 or 3 carbon atoms, to promote the uniform deposition on the beads of the desired liquid phase, and being characterized by resistance to bleed at a temperature of at least 200° C., then contacting the beads with a second solution containing a stationary liquid phase under conditions selected so that a coating of said stationary liquid phase of from about 0.05 to about 0.5 percent is imparted to said beads.

2. The method of claim 1 wherein the concentration of said surfactant in said first solution is from about 0.05 to about 1 weight percent.

3. The method of claim 2 wherein the concentration of said surfactant in said first solution is from about 0.25 to about 0.3 weight percent.

4. The method of claim 2 wherein said second solution contains from about 1 to about 10 weight percent of said stationary liquid phase.

5. The method of claim 4 wherein the surfactant contains a plurality of fluorine atoms.

6. The method of claim 5 wherein the surfactant is selected from the group consisting of
   (a) a fluorinated alkyl ester corresponding to the formula

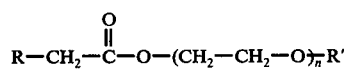

where R is a fluorinated alkyl group; R' is H, and $n$ is an integer of at least 5;
   (b) the surfactant in (a) where R' is $CH_3$; and
   (c) a mixture of the surfactants of (a) and (b).

7. The method of claim 6 wherein said method includes the removal of excess surfactant solution between said contacting steps.

8. The method of claim 7 wherein said method includes the step of drying said beads to a freely flowable state following said second contacting step.

9. The method of claim 4 wherein the surfactant is polyoxypropylene, 40 percent ethoxylated.

10. In the method of measuring air-borne concentrations of chloromethylmethyl ether and bis-chloromethyl ether wherein 2,4,6-trichlorophenate derivatives of said ethers are separated and quantitatively measured by passing a fluid containing said derivatives through a bed comprising a solid support, said support having a liquid phase thereon, the improvement which comprises: employing as said bed, etched glass beads which have been treated according to the method recited in claim 1.

11. The method of claim 10 wherein the surfactant contains a plurality of fluorine atoms.

12. The method of claim 11 wherein the surfactant is selected from the group consisting of
   (a) a fluorinated alkyl ester corresponding to the formula

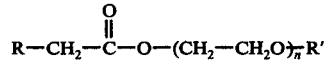

where R is a fluorinated alkyl group; R' is H, and $n$ is an integer of at least 5;
   (b) the surfactant in (a) where R' is $CH_3$; and
   (c) a mixture of the surfactants in (a) and (b).

13. The method of claim 10 wherein the surfactant is polyoxypropylene, 40 percent ethoxylated.

* * * * *